Dec. 29, 1970   M. FORICHON   3,550,467

GEARBOX CONTROL DEVICE

Filed Nov. 6, 1968

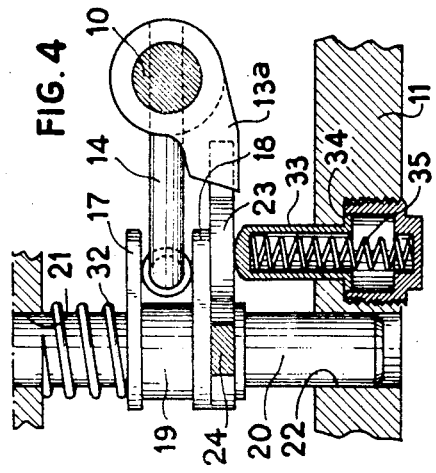
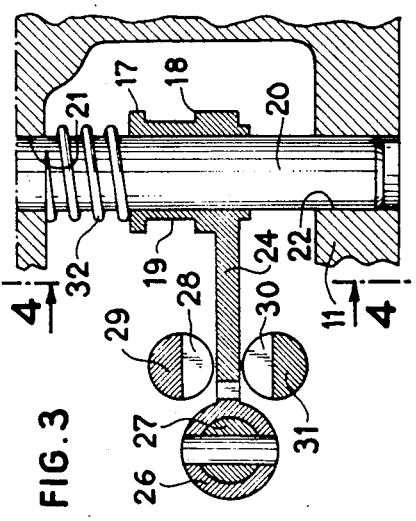
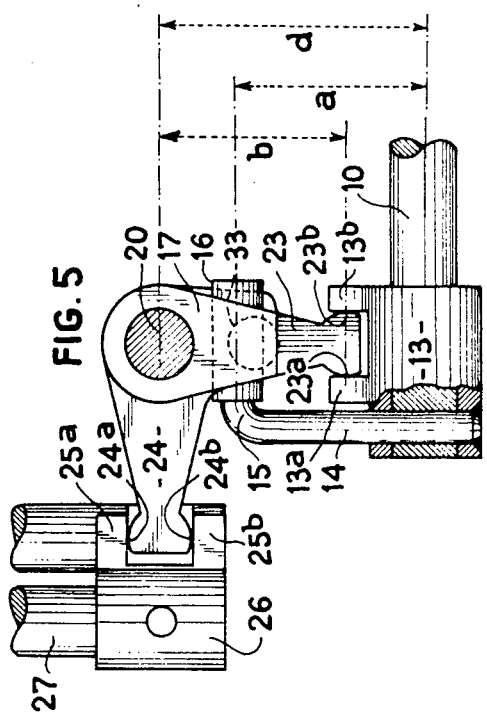

United States Patent Office 3,550,467
Patented Dec. 29, 1970

3,550,467
GEARBOX CONTROL DEVICE
Michel Forichon, Rueil-Malmaison, France, assignor to Automobiles Peugeot and Regie Nationale des Usines Renault, Paris and Billancourt, France, respectively, both French body corporates
Filed Nov. 6, 1968, Ser. No. 773,862
Claims priority, application France, Dec. 5, 1967, 130,954
Int. Cl. G05g 9/12
U.S. Cl. 74—473                5 Claims

ABSTRACT OF THE DISCLOSURE

Control device for a vehicle gearbox comprising a control lever connected to a rotatable and slidable rod which is connected by connecting means to a slidable and rotatable speed selecting and changing lever. A block is rigidly fixed to the rod and has two side faces one of which grips one of the branches of the speed selecting and changing lever. The block is connected to a cranked finger having a free end parallel to the rod and engaged in a fork formed on a ring constituting the sliding and rotating hub of the speed selecting and changing lever.

---

The present invention relates to floor-mounted control devices for gearboxes of vehicles and more particularly vehicles equipped with a transverse engine-transmission unit.

It is known that for the purpose of engaging a given speed or gear ratio, one of the fork rods must first be selected and then shifted longitudinally so as to drive along through a fork, the synchronizer or the sliding gear which engages the pair of gears corresponding to the chosen ratio.

The object of the invention is to provide an improved control device for a gearbox for a vehicle and in particular a vehicle equipped with a transverse engine-transmission unit, this device being simple in construction and having no cable or connecting rod connection. In the device according to the invention, the shifting lever is connected by a double pivot to a rod which is rotatable and slidable in the wall of the case of the gearbox into which it extends and in which connecting means connect said rod to a motion-changing lever for selecting and changing the speeds which is connected to a shaft which is slidable and rotatable in two bores in the case for respectively selecting and changing the speeds, said connecting means being such that the rotation and the sliding of said rod impart respectively to said speed selecting and changing lever the sliding movements for selecting and rotating movements for changing the speeds.

Further features and advantages of the invention will be apparent from the ensuing description with reference to the accompanying drawings:

In the drawings:

FIG. 3 is a vertical sectional view taken along line 3—3 of FIG. 2 on an enlarged scale;

FIG. 4 is a vertical sectional view taken along line 4—4 of FIG. 3, and

FIG. 5 is a plan view corresponding to FIG. 3 which is in fact an enlarged view of a detail shown in FIG. 2.

Figure 1:
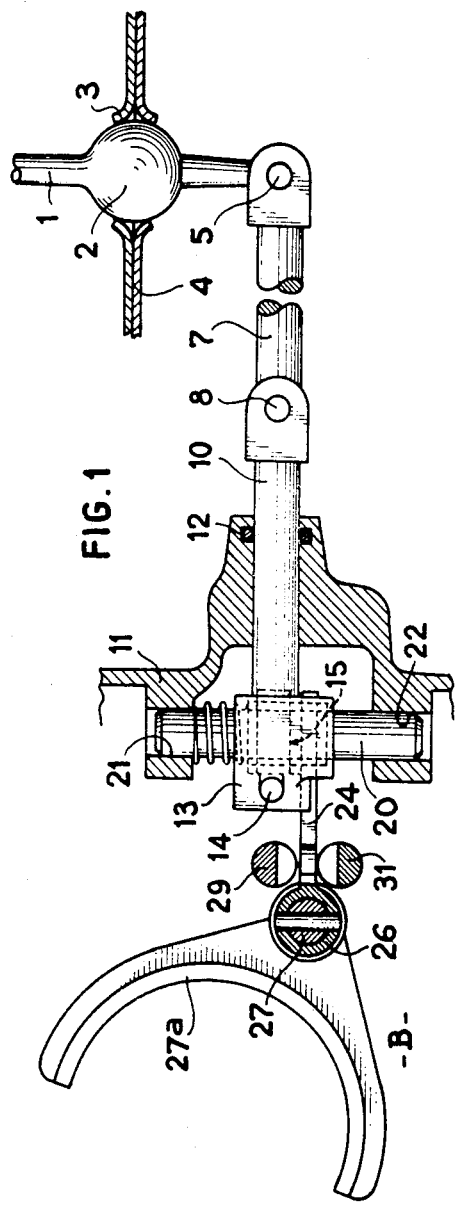
FIG. 1 is an elevational view, partly in longitudinal section, of the assembly of the control device.
Figure 2:
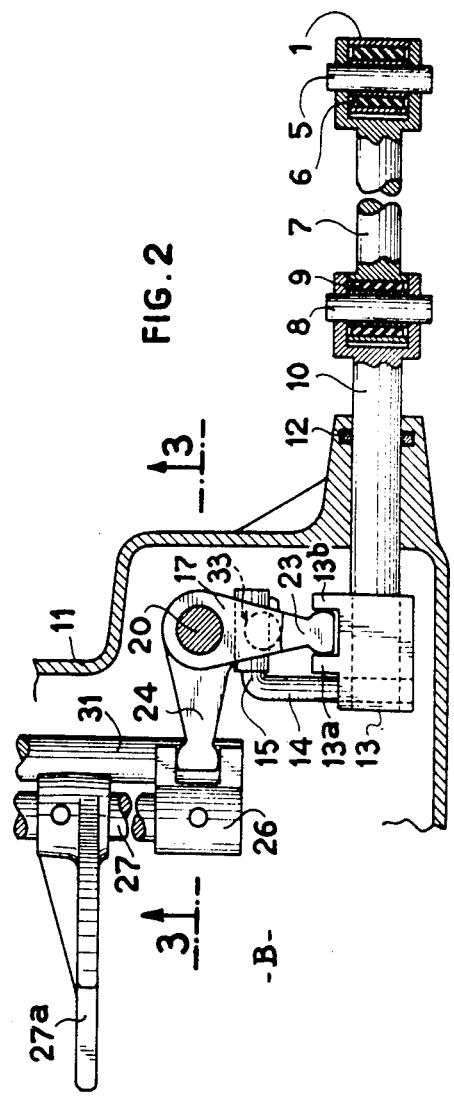
FIG. 2 is a corresponding plan view also partly in section.

In the illustrated embodiment, the gear or speed control lever 1 is pivotable in all directions in the known manner owing to the provision of a ball 2 mounted in a support which is diagrammatically shown at 3 and connected to the floor 4 of the vehicle.

The lower part of the lever 1 under the ball joint 2 is connected by a first pivot 5, including an elastically yieldable sleeve 6, to a link 7 which is connected through a second pivot 8, also having an elastically yieldable sleeve 9, to a cylindrical rod 10. The latter is rotatable and slidable in the wall of the case or housing 11 of the gearbox and extends into the latter, only a part of the housing having been shown. A seal is provided around the rod 10 by a sealing element 12.

Fitted on the end of the rod 10 is a shifting block 13 having two side faces 13$^a$ and 13$^b$. The block 13 is positively connected to the rod 10 by a rod 14 an end portion of which extends through these two elements.

The free end 15 of the rod 14 is cranked at 90° and is provided with a sleeve 16 of a flexible plastics or other material adapted to absorb noise. This sleeve is engaged between two side walls 17 and 18 which constitute a fork and a ring 19 (see in particular FIGS. 3 and 4) connected to a shaft 20 which is orthogonal to the rod 10 and slidable in two coaxial bores 21 and 22 in the case 11.

The ring 19 in fact constitutes the hub of a cranked lever having two branches 23 and 24 extending in two perpendicular directions. The branch 23 of the lever is engaged through two cylindrical bearing portions 23$^a$ and 23$^b$ between the two side walls 13$^a$ and 13$^b$ of the block 13, whereas the second branch 24, which also terminates in two cylindrical bearing portions 24$^a$ and 24$^b$, is engageable selectively:

between the inner faces of two lugs 25$^a$ and 25$^b$ of a block 26 connected to the conventional rod 27 of the fork 27$^a$ of the third and fourth speeds, or between the lateral faces of a recess 28 in the rod 29 of the fork of the first and second speeds;

or between the lateral faces of a recess 30 to the rod 31 of the fork of the revere speed.

In neutral position, the cranked motion-changing lever is maintained in the median upper position by a compression spring 32 and, near the lower part, by the bearing of a finger 33 itself maintained in abutting relation on a shoulder 34 by a spring 35 (FIG. 4) whose stiffness is distinctly greater than that of the spring 32.

The device operates in the following manner:

The speeds are selected by shifting the upper part of the gear or speed control lever 1 in a transverse plane of the vehicle, that is, in a direction perpendicular to the plane of FIG. 1. This causes the rotation of the link 7 and consequently of the rod 10, the slight angular offset between these elements 7 and 10 being absorbed by the elastically yieldable sleeve 9. Rotation of the rod 10 drives the rod 14 whose cranked end 15 shifts in translation the ring 19 connected to the shaft 20. If the lever 1 is shifted to the left of the vehicle, the ring 19 is shifted upwardly and compresses the spring 32 and the finger 24 is engaged in the recess 28 in the rod 29 of the first and second speed fork. If, on the other hand, the lever 1 is shifted to the right of the vehicle, the ring 19 is shifted downwardly and compresses the spring 35 and the finger 34 is engaged in the recess 30 in the rod 31 of the reverse speed fork. This requires a greater effort than in the preceding case owing to the difference between the stiffnesses of the springs 35 and 32.

Finally, in the intermediate position of the lever 1, the finger 24 is engaged between the two lugs 25$^a$ 25$^b$ of the block 26 of the rod 27 of the third and fourth speed fork.

Once the selection has been made, the actual changing of the gear is carried out by shifting the upper part of the lever 1 in a direction parallel to the longitudinal axis of the vehicle, that is, in the plane of FIG. 1. This shifting moves in translation the link 7 and the rod 10 which rotates, through the block 13, the cranked lever (19, 23, 24) and consequently moves the previously selected fork rods in translation.

It will be observed that, owing to the fact that the lever 23, 24 is caused to slide by the cranked rod 14 whereas it is rotated by the block 13, it is possible to place the end of the branch 23 of the lever near the axis of the rod 10 and the free end 15 of the rod 14 very near the shaft 20.

Consequently, the distance $d$ between the axes of the rod 10 and shaft 20 is very distinctly less than the sum of the distances $a$ and $b$ which would be necessary for achieving a sufficient movement, in both translation and rotation, of the lever 23, 24 with a conventional device differing from that disclosed here. The overall size of the control device according to the invention is therefore substantially reduced, which is particularly advantageous.

Although a specific embodiment of the invention has been described, many modifications and changes may be made therein without departing from the scope of the invention.

Having now described my invention what I claim as new and desire to secure by Letters Patent is:

1. A control device for a gearbox for a vehicle, said device comprising a control lever operatively connected to a rod which is rotatable and slidable in the wall of the case of the gearbox into which it extends and in which connecting means connect said rod to a motion-changing speed selecting and changing lever which is slidable and rotatable relative to said case, said speed selecting and changing lever having two branches, one branch being adapted to be selectively connected to shift rods in the gearbox, said connecting means being such that the rotation and the sliding of said rod respectively impart to said speed selecting and changing lever the sliding movements for selecting and the rotating movements for changing the speeds, said connecting means including a block rigidly fixed to said rod inside said gearbox, said block having two side faces which contact the other of the branches of said speed selecting changing lever, said speed selecting and changing lever having a ring comprising a translating and rotating hub therefor, a fork being comprised by said ring, a crank finger being connected to said block and having a free end portion parallel to said rod and engaged in said fork.

2. A device as claimed in claim 1, wherein said ring is connected to a shaft which is slidable and rotatable in two bores in said case of said gearbox.

3. A device as claimed in claim 1, wherein said finger has another free end constituting a pin extending through said block and said rod.

4. A device as claimed in claim 1, comprising two opposing spring means for maintaining said speed selecting and changing lever in the neutral position, that one of said spring means which must be deformed for selecting the reverse speed being stiffer than the other of said spring means.

5. A device as claimed in claim 1, wherein said control lever is connected to said rod by a link pivoted to said control lever and to said rod with interposition of elastically yieldable sleeves.

References Cited
UNITED STATES PATENTS

| | | | |
|---|---|---|---|
| 2,094,976 | 10/1937 | Bachman | 74—473 |
| 2,390,711 | 12/1945 | Holmstrom | 74—473 |
| 2,517,871 | 8/1950 | Gustafson | 74—473 |

MILTON KAUFMAN, Primary Examiner